Feb. 12, 1946. R. H. BROWN 2,394,892
ELECTRONIC PHASE BRIDGE
Filed July 16, 1943

ROBERT H. BROWN
INVENTOR

BY John J. Logan
ATTORNEY

Patented Feb. 12, 1946

2,394,892

UNITED STATES PATENT OFFICE 2,394,892

ELECTRONIC PHASE BRIDGE

Robert Henry Brown, Emporium, Pa., assignor to Sylvania Electric Products Inc., Emporium, Pa., a corporation of Massachusetts Application July 16, 1943, Serial No. 494,923

8 Claims. (Cl. 171—95)

This invention relates to metering devices for A. C. measurements, and more particularly to methods and apparatus for the exact determination of impedances, frequencies, and phase differences of electrical signals.

The invention is based on a known combination of a special A. C. bridge for determining impedance with a phase sensitive galvanometer, sometimes called "cosine galvanometer." The latter instrument has been described by C. R. Cosens (Proc. Phys. Soc., London, 46, 181, 1934). According to Cosens, plate voltage is supplied to a triode (or pentode, or another suitable amplifier tube) by a full wave rectifier, in the form of pulsating D. C. In a typical circuit of this kind as shown in Fig. 1, the midpoint 5 of the secondary 6 of a transformer 7 is connected to the plate 8 of the triode T₁, and its two ends are coupled to the two cathodes of two rectifier tubes, or to the cathodes of a double diode as shown. Their respective plates 9 and 10 are connected to the cathode 11 of the triode T₁, with resistances (R₁) in series between each rectifier anode and the cathode of the triode. For constant D. C. voltage on the grid 12, the plate current through the triode during one half cycle will be identical with that during the other half cycle, if the plate impedances of the two rectifier diodes are equal and if the two series resistors (R₁) are equal. Accordingly, a sensitive galvanometer G of sufficient inertia shunted between the rectifier plates will not be deflected so long as the A. C. supplied to the rectifiers and to the triode plate is symmetrical during the two half cycles.

Phase differences between the voltage applied to the secondary of the transformer and that of a signal of the same frequency fed to the input terminals 1, 2 of the triode over a delaying network can then be measured in various ways, e. g., by adjusting a phase shifter in the grid circuit of the triode so as to obtain zero reading of the galvanometer. The galvanometer reading will be zero for a phase difference of 90° between plate and grid voltages, and a maximum for zero phase difference. For phase differences having any arbitrary value (not equal to 0° or 90°) between the two voltages, the galvanometer reading is appropriately proportional to the cosine of the phase difference. This measuring device is therefore usually referred to as a cosine galvanometer.

While the circuit may thus be used as a "cosine galvanometer" for measuring phase differences, it is also capable of yielding measurements of frequencies and impedances of any kind if properly connected with other circuit elements, particularly at the input of the triode.

The galvanometer between the plates of the rectifier tubes measures the time average of voltage drops developed over the two series resistors in response to the pulsating currents flowing alternately through the two rectifier paths in series with the plate space discharge gap of the triode. Thus the "cosine galvanometer" fulfills a function similar to that of an ordinary bridge circuit, and the present invention contemplates the use of the "phase bridge" (which phrase will be used herein to indicate this combination of a triode with the two resistors, rectifiers, and A. C. supplies) for measuring impedances and frequencies by means of a properly arranged auxiliary circuit.

Such an auxiliary circuit has been developed in the form of a special bridge in the triode input circuit of the phase bridge. As will be explained in detail hereinbelow, this special bridge which serves primarily the purpose of adjusting the phase of the triode input voltage so as to obtain zero galvanometer reading, may also be applied for measuring impedances, in connection with the phase bridge. The interesting feature of this combination of bridges (e. g., as described by J. R. Barnhart, "Instruments," vol. 14, page 89, 1941) is that it offers the means for measuring complex impedances inserted in one branch merely by varying an ohmic resistance in another branch. The combination and the method of using it for measuring purposes as has been described in the prior art just mentioned disregards a number of errors found to be inherent in the nature of the combination which may, in many practical cases, amount to values of substantial magnitude, so as to reduce the device to a mere indicator.

It is, therefore, a principal object of the invention to provide means whereby the inherent inaccuracies of a phase bridge are eliminated.

Another principal object is to provide for eliminating errors in the use of a phase bridge which result from the variations of tube characteristics during each half cycle, such for example as the amplification constant of the detector tube, or its plate resistance, or the plate resistance of the rectifier tube.

According to another object, means are provided to determine the impedance of an unknown element, or the frequency of a given A. C. voltage, by two readings of a single variable resistance arm in a first bridge, which will result in zero galvanometer readings in an averaging rectifier bridge.

Another principal object provides means for determining the exact value, or the absolute value (to a high degree of accuracy) of an impedance, or its phase angle, from two different values so chosen on a single adjustable resistor in a bridge circuit as to obtain zero galvanometer readings in an auxiliary circuit.

According to a further object of the invention, means are provided whereby a reversal of polarity of the input voltage into a bridge circuit is utilized to eliminate the inaccuracy in the conventional use of a phase bridge.

A feature of the invention relates to the elimination of errors in the reading of a phase bridge which result from the fact that current is taken from the bridge by the detector, or which result from the presence of undesired harmonics in the supply or test voltage.

Another feature relates to the elimination of errors in the reading of a phase bridge which are caused by the difference in peak grid input voltages during two readings taken with reversed input polarity.

Another feature relates to the provision of a phase shifter between one set of terminals of the grid input bridge, whereby exact measurements become possible without resorting to a reversal of terminals and to a corresponding resetting of the bridge resistance.

Additional objects and features will be apparent as the disclosure proceeds.

The invention will now be described in connection with the drawing, in which.

Figures 1, 2:
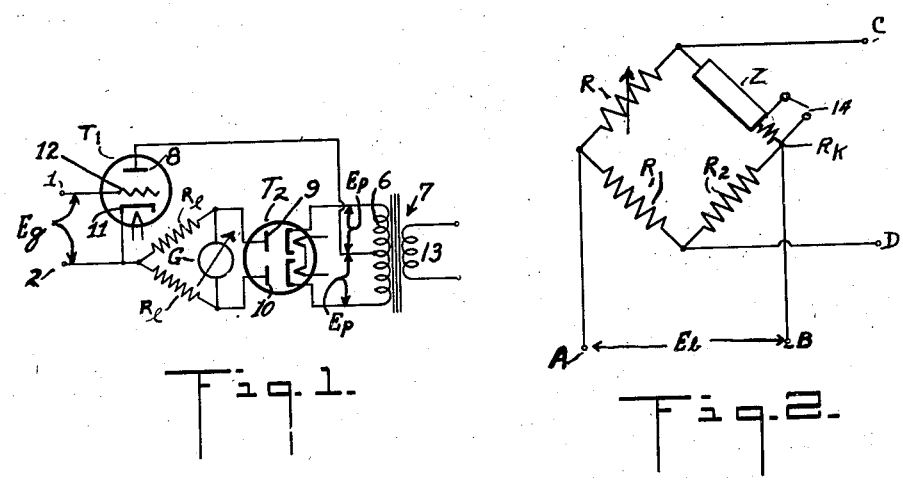
Fig. 1 is a circuit diagram of the known phase-sensitive galvanometer arrangement which is used in the method according to the invention.
Fig. 2 is a schematic diagram of the known grid input circuit bridge used with Fig. 1.

Referring now to Fig. 1, when an alternating current is flowing in the primary 13 of the transformer 7 shown, it is evident that during one half period, the plate current of the grid-controlled tube $T_1$ will flow back to one end of the transformer between one of the pairs of electrodes in the twin-diode $T_2$, and during the other half cycle it will flow to the other end of the transformer between the other pair of electrodes of the twin-diode.

In developing a theory for the operation of this circuit the tube characteristics may not be considered as constants, since the plate current is continuously varying from zero to its peak value. Let them be represented by arbitrary functions of time, $\mu(t)$, $\phi_1(t)$, and $\phi_2(t)$ representing the voltage amplification of $T_1$, the plate resistance of $T_1$, and the plate resistance of $T_2$, respectively. The galvanometer current $I_{ga}$ through the galvanometer G may be expressed by $$I_{ga} = \Sigma_n (A_n E_{gn} \sin \alpha_n + B_n E_{gn} \cos \alpha_n + C_n) \quad (1)$$

In this equation, the values $\alpha_n$ are simply related to the phase differences $n\alpha_n$ between input and "effective" plate voltage of the various harmonics; $E_{gn}$ is the voltage amplitude of the $n$th harmonic fed to the grid input, and $A_n$, $B_n$, and $C_n$, are functions determined by the circuit elements, the construction of the tubes, and the range and manner of the plate current variation during each half-cycle of operation. If all the harmonics are filtered out of $E_g$, the galvanometer current is given simply by Equation 2, in which $\alpha$ is the phase difference between $E_g$ and the "effective plate voltage $E_p$".

$$I_{ga} = AE_g \sin \alpha + BE_g \cos \alpha + C \quad (2)$$

The expectation that the galvanometer current would be zero for some particular value of $\alpha$ is verified by experiment. Equation 2 would seem to indicate that there might be more than one value of $\alpha$ for which this would be true, but this has not been observed to be the case in the work actually carried on with this circuit.

The use of the phase bridge has been explained in the prior art on the assumption that the values of A and C in the foregoing equations are strictly zero. While it has been indicated in the prior art that this condition is not exactly fulfilled, apparently no attempt has been made to investigate the nature of the undesirable inaccuracies resulting from this fact, to make an estimate of the order of magnitude of these sources of error, and, what is most important from a practical viewpoint, no attempt has been made to devise a method which makes it possible to eliminate the influence of the finite values of the quantities A and C, on the characteristics which it is desired to measure.

In order to point out more clearly the nature of my invention, it may be characterized as consisting in transforming the known phase sensitive galvanometer circuit arrangement into a reliable precision measuring circuit for measuring the phase relations, and the correct methods of determining impedances and phase differences.

In accordance with known practice the bridge circuit of Fig. 2, has its terminals C and D directly connected to the grid input terminals of tube $T_1$, i. e. terminals 1 and 2 (Fig. 1), so as to deliver to it the grid voltage $E_g$, whose phase angle with the "effective" plate voltage has been designated by $\alpha$ in Equations 1 and 2. Heretofore the input terminals A and B of the bridge have been connected directly to a voltage supply $E_b$, which is either to be compared in phase to the plate voltage supply $E_p$ of Fig. 1, or which is derived from the same voltage source $E_p$ and used to determine its frequency, or for the purpose of finding the value of a reactance Z placed into branch BC of the bridge of Fig. 2 by proper adjustment of a variable resistance R in branch AC of the same bridge.

With this known arrangement let there be an unknown phase angle $\theta$ between $E_b$ and $E_p$, and consider first the problem of finding the phase difference between two voltages $E_{b1}$ and $E_{b2}$ applied to points A and B, when Z is a known impedance $(r+jX)$, by null readings of the galvanometer G in the circuit of Fig. 1. The impedance Z is connected between points B and C of the bridge (Fig. 3), and potential $E_{b1}$ is applied to points A and B of that bridge. In order to obtain zero galvanometer reading, the variable resistor R is adjusted to a value $R_{s1}$. It can be shown that the angle $$\left(\theta_1 - \alpha + \frac{\pi}{2}\right)$$

is related to the impedance Z and the resistance setting $R_{s1}$ on the variable resistor R, by the equation $$\tan\left(\theta_1 - \alpha + \frac{\pi}{2}\right) = (R_{s1}^2 - Z^2)/2R_{s1}X \quad (3)$$

wherein X is the effective series reactance of Z, its effective series resistance being $r$, wherein $\theta_1$ is the phase angle of $E_{b1}$ with reference to an arbitrary fixed zero phase. Similarly, the angle $$\left(\theta_2 - \alpha + \frac{\pi}{2}\right)$$

corresponding to a voltage $E_{b2}$ of the same frequency, connected to points A and B of the bridge and for a setting $R_{a2}$ of resistor R can be found from the equation:

$$\text{Tan}\left(\theta_2 - \alpha + \frac{\pi}{2}\right) = (R_{a2}{}^2 - Z^2)/2R_{a2}X \quad (3')$$

In this equation $\theta_2$ is the phase angle of $E_{b2}$ against the above-mentioned arbitrary fixed zero phase, and $R_{a2}$ is the value of the variable resistance R which must be set in order to again obtain the zero galvanometer reading. The phase angle $\theta$ (i. e. $\theta_1 - \theta_2$) between $E_{b1}$ and $E_{b2}$ can thus be found from two null galvanometer readings by simply subtracting the arc tans of the tangents whose values are given by the right-hand sides of Equations 3 and 3'. This is due to the fact that for a null reading of the galvanometer, the angle must have a definite value, viz., the value which makes the left-hand side of Equation 2 equal to zero.

In other words, the use of the combination of Figs. 1 and 2 has been based on the assumption (which is not generally true) that $\alpha = 90°$ will make $I_{ga} = 0$ in Equation 2. In accordance with this invention, the phase measurement is now based on Equation 2 quite independently of the values which A and B may have under the particular conditions of the test. In particular, this phase measurement is independent of the tube characteristics and of the stray reactances of the transformers and other accidental circuit elements.

Next consider the problem of judging the absolute value of the impedance $A = r \pm jX$ from null galvanometer readings, and the value of $R_s$ to which the variable resistor R of branch AC in Fig. 2 has to be adjusted for obtaining this zero reading. It can be shown that the absolute value of Z is found from two settings $R_{a1}$ and $R_{a2}$ of variable resistor R, obtained for direct and reversed connection of voltage $E_b$ of unknown phase angle $\theta$ with respect to $E_p'$, from the equation:

$$(r^2 + X^2 \equiv Z^2) = R_{a1}R_{a2} \quad (4)$$

According to the prior use of the combination of Figs. 1 and 2, it was taken for granted that $R_{a1} = R_{a2}$. This is only true, however, under certain conditions which are usually not fulfilled in making practical measurements. These conditions are connected substantially with the fact that the quantities A and C (Equation 2) are usually not equal to zero, and that it is frequently very difficult actually to determine their relative values as compared with the quantity B of Equation 2.

Equation 4 gives only the absolute value of impedance Z. According to the invention, the bridge can also be used for determining the values of $r$ and $Z$ of the ohmic and reactive components of $Z = r \pm jX$. As explained, this is accomplished by making a second set of null adjustments of the galvanometer, with two reversed terminal connections of $E_b$ at points A and B of the bridge. In this second set of measurements, however, a known ohmic resistance $R_k$ is added in series with impedance Z between terminals B and C of the bridge of Fig. 2 for example by opening the short-circuiting switch 14. The values of $r$ and $X$ may then be calculated from Equation 4 above and from the following equation:

$$(r + R_k)^2 + X^2 \equiv r^2 + 2rR_k + R_k{}^2 + X^2 = R_{b1}R_{b2} \quad (5)$$

$R_{b1}$ and $R_{b2}$ are the values to which the resistance R had to be adjusted in the last two measurements with reversed switch positions, in order to obtain zero galvanometer reading.

The sensitivity obtainable is largely determined by the tubes, the galvanometer, and the other constants of the circuit, as well as the magnitudes of $E_b$ and $E_p$. $T_1$ should have as large a transconductance as practicable. Any double diode or two tubes operating as single diodes may be used for $T_2$, the choice depending upon the amount of power available for $E_p$ and upon convenience. R is chosen to keep the current within the rated values for $T_1$ and $T_2$ and for maximum galvanometer sensitivity. The galvanometer should be of the zero-center type and should have a sufficiently high moment of inertia to prevent its pointer from showing vibration at the operating frequency.

In an experimental set-up using a type 6J5 tube for $T_1$, a type 25Z5 for $T_2$, a galvanometer capable of indicating current differences of about 1.5μA, $R_1 = R_2 = 5000$ ohms, with $C = 0.500\mu f$, and working at a frequency of 60 C. P. S., $E_b$ being 6 volts R. M. S., and $E_p$ 220 volts R. M. S., the adjustment of R was found to be critical to within one ohm, or one part in 5000. When $E_b$ was taken from a heavy duty filament winding on the same transformer supplying $E_p$, $(\theta - \phi)$ was found to be 1506 seconds, $\phi$ being $(\alpha - \pi/2)$. This shows that the constants A and C in Equation 2 are, as might be expected, small compared with B.

In using the electronic phase bridge as described above, one encounters three sources of error not met with in ordinary bridge work:

(1) Errors caused by current taken from the bridge by the detector.

(2) Errors resulting from a change in the values of A, B, and C in Equation 2 caused by differences in the peak value of $E_g$ for the two different balance adjustments, and (3) Errors caused by the effects of harmonics in $E_g$.

Figure 3:
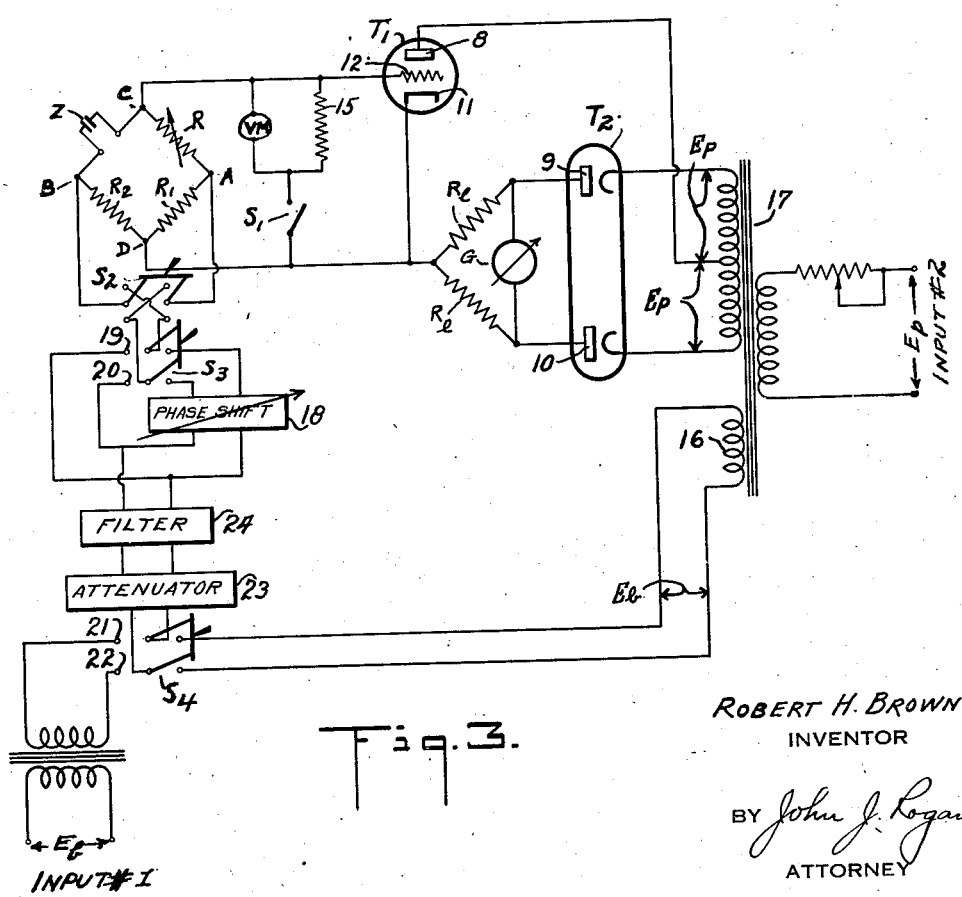
Fig. 3 is a diagram showing improvements incorporated in the combination of Figs. 1 and 2 according to the invention.

Fig. 3 shows how the prior arrangement comprising the combination of Figs. 1 and 2 can be modified to overcome the above-noted sources of error. In this arrangement, the voltages $E_b$ whose phases are to be compared with $E_p$ instead of being directly applied to the terminals A and B, are applied through attenuator 23, harmonic filter 24, and phase shifter 18 which can be switched into and out of circuit by a double pole-double throw switch $S_3$ and whose polarity connection can be reversed by switch $S_2$. Furthermore, the grid-cathode circuit of tube $T_1$, is provided with an input impedance in the form of a resistance 15 which can be inserted and removed by switch $S_1$. One of the reasons for using the phase shifter 18 is that when it is inserted and the bridge balanced before the measurement, it is merely necessary thereafter when using the bridge to measure an unknown impedance Z, to take two readings of the resistance R. Furthermore, by means of the adjustable phase shifter, it is possible to adjust the bridge so that $\theta = \phi$, and under this condition R and $R_1$ will be equal and the position of switch $S_2$ has no effect on the bridge balance adjustment. In that event, Z will simply be equal to R.

When using the arrangement to measure frequencies, a known impedance Z is inserted and the switch $S_4$ is closed on to its left-hand contacts and the signal frequency to be measured is applied to "input #1."

The first source of error may be removed by making the input impedance of the detector very high compared with that of the bridge, e. g., disconnecting the resistor which may be connected between the grid and cathode of $T_1$ when making the final balance adjustments. Switch $S_1$ in the diagram of Fig. 3 is provided for this purpose. $T_1$ should be biased in any well-known manner so that its grid is always negative with respect to its cathode in order to avoid errors from this source. Simple cathode bias does not fulfill this condition, since $i_p$ drops to zero twice every cycle.

The second source of error is not likely to be large. It can be removed by adjusting $E_b$ (providing the adjustment does not change its phase) so that $E_g$ has always the same value when final balance adjustments are made. A high impedance voltmeter VM (Fig. 3), preferably electronic, across the input to $T_1$ will provide for this correction. A better way of removing this source of error is to make $\theta$ equal to $\phi$ by means of a phase shifting device. When this condition is obtained R and R' will be equal and the position of $S_2$ (Fig. 3) will have no effect on the balance adjustments. In this case, Z will be simply equal to R.

In practice, the use of the phase shifter shown in Fig. 3 is always indicated if a large number of measurements is to be made with a given input voltage at input #1. It will take about three to four trial settings of the phase shifter before the condition of $R=R'$ for zero galvanometer reading is reached, for direct and reversed polarity of switch $S_2$. When using the arrangement for measuring the absolute value of a single unknown impedance Z in the bridge of Fig. 3, it is, of course, more expedient to omit the adjustments of the phase shifter of Fig. 3, as in this case Z may be determined from two zero galvanometer readings, with direct and reversed polarity of the voltage fed to the input of the bridge of Fig. 2. For this purpose, switch $S_3$ is closed on to contacts 19 and 20, and switch $S_4$ is closed on to contacts 21, 22.

The attenuator 23 indicated in Fig. 3 serves for adjusting the amplitude of the grid input signal to a value at which the plate current of tube $T_1$ is kept within practical limits considering the characteristics of this tube.

The third source of error, namely the harmonics in the detector input, is likely to be troublesome. The relationship between $\alpha_1$, $\alpha_2$, $\alpha_3$, etc., in Equation 1 will vary according to the setting of R of Fig. 2. Hence, in order to obtain accurate balance indications the harmonics in $E_b$, or $E_g$, must be filtered out so as not to affect the galvanometer deflection appreciably. The filter 24 indicated in Fig. 3 is for the purpose of overcoming the third source of error above noted.

For making measurements of impedance and frequency the signal used is fed into input #2. For making measurements of phase relationships, power at the frequency of the signal under study is fed into input #2 and the signals whose phase relationships are to be measured are fed into input #1.

It is to be understood that within the spirit and scope of this invention, other bridge-type circuits or other circuit elements may be used to serve the same functions in the device herein described as are served by the bridge arrangement shown in Fig. 2. If desired, an amplifier may be used between the bridge and $T_1$ for improving the sensitivity and/or the stability. Likewise the galvanometer may be connected into the circuit through an amplifier (preferably of the balanced type) for improving sensitivity. In addition the filter, when needed, may be placed either in the input or the output from the bridge. The expression "cosine galvanometer" as employed in the claims is intended to mean "a galvanometer arrangement wherein the indications of the galvanometer are proportional to the cosine of the phase angle being measured."

What is claimed is:

1. In a measuring system of the character described, an impedance bridge of the Wheatstone type, a phase sensitive detector arrangement of the cosine galvanometer type connected across two conjugate points of said bridge, means to impress test voltages across the other conjugate points, the last-mentioned means including an adjustable phase shifter and a reversing switch for changing the relative phase relations between said other conjugate points and said phase shifter, and means including said phase shifter to balance the bridge whereby the zero setting is independent of the polarity setting of said switch, said cosine galvanometer comprising a detector having a conjugate network with an indicator which responds proportionally to the cosine of the phase angle of the voltages impressed thereon.

2. A measuring system according to claim 1 in which another switch is provided for impressing the test voltages on said other conjugate points either directly or through said phase shifter.

3. A measuring system according to claim 1 in which said phase sensitive detector comprises a grid-controlled electron tube having its input terminals connected across said first-mentioned conjugate points and its plate-cathode circuit including a pair of symmetrical paths each path comprising a potential source, a diode rectifier and a resistor, whereby said diodes are rendered alternately conductive, and a galvanometer connected across said resistors and responsive to the cosine of the phase difference between the voltages from said potential source and the voltages applied to the grid of said tube.

4. In a measuring system of the character described, an impedance bridge of the Wheatstone type, two ratio arms of which are constituted of fixed resistors, the other two arms of which are constituted respectively of a variable resistance and an impedance; a second bridge of the Wheatstone type, two ratio arms of which are constituted respectively of a resistor and a diode with a series alternating potential, the other ratio arms of which are likewise constituted respectively of a resistor and a diode with a series A. C. potential so that both diodes are conductive in balanced opposite phase relations from said A. C. potential, and a grid-controlled electron tube having its plate-cathode return connected across one pair of conjugate points of said second bridge and its grid-cathode return connected across one pair of conjugate points of said first bridge, a galvanometer connected across the other pair of conjugate points of said second bridge, and means to impress a test voltage across the other conjugate points of the first bridge, the last-mentioned means including a reversing switch and a phase shifter arranged to be adjusted with respect to the ratio arms of the first bridge so that the zero setting of said first bridge is unchanged in either position of said switch.

5. A measuring system according to claim 4 in which a vacuum-tube voltmeter is connected across the grid-cathode return of said tube to eliminate errors which tend to result from difference in the peak values of the voltages applied to the grid of said tube.

6. A measuring system according to claim 4 in which the said last-mentioned means also includes a filter for filtering-out harmonics of the said test voltage.

7. In a measuring system of the character described, a Wheatstone bridge, said bridge having a pair of ratio arms each of which is constituted of a fixed resistor, the other pair of arms being respectively constituted with an adjustable resistor and an impedance; a phase sensitive detector connected across one pair of conjugate points of said bridge, said detector including a grid-controlled electron tube, a pair of diodes fed in opposite balanced phase relation from a source of alternating voltage, the diodes being connected so as alternately to apply a rectified voltage between the plate and cathode of said tube, a galvanometer connected across said diodes and producing an indication which is proportional to the cosine of the phase difference between the voltages applied to the grid and plate of said tube; and means to impress a test voltage across the other pair of conjugate points of said bridge, the last-mentioned means including a phase shifter and a reversing switch, and the phase shifter being arranged for adjustments so that the zero setting of said bridge is independent of the polarity setting of said switch.

8. In a measuring system of the character described, an impedance bridge of the Wheatstone type, a phase-sensitive detector of the cosine galvanometer type connected across two conjugate points of said bridge, means to impress test voltages across the other conjugate points, the last-mentioned means including an adjustable phase shifter and a reversing switch for changing the relative phase relations between said other conjugate points and said phase shifter, and means including said phase shifter to balance the bridge so that the zero setting is independent of the polarity setting of said switch, said cosine galvanometer including a conjugate network having two pairs of conjugate points, a grid-controlled amplifier having its plate-to-cathode circuit connected across one of said pairs of conjugate points of said network and an indicating galvanometer connected across the other pair of said conjugate points of said network.

ROBERT HENRY BROWN.